United States Patent
Jo et al.

(10) Patent No.: US 11,611,077 B2
(45) Date of Patent: Mar. 21, 2023

(54) POSITIVE ELECTRODE ACTIVE MATERIAL FOR SECONDARY BATTERY, METHOD FOR PREPARING THE SAME, AND LITHIUM SECONDARY BATTERY INCLUDING THE SAME

(71) Applicant: LG Chem, Ltd., Seoul (KR)

(72) Inventors: Chi Ho Jo, Daejeon (KR); Min Kyu You, Daejeon (KR); Sung Bin Park, Daejeon (KR); Hyuck Hur, Daejeon (KR); Jin Tae Hwang, Daejeon (KR); Wang Mo Jung, Daejeon (KR)

(73) Assignee: LG Energy Solution, Ltd.

( * ) Notice: Subject to any disclaimer, the term of this patent is extended or adjusted under 35 U.S.C. 154(b) by 266 days.

(21) Appl. No.: 16/647,307

(22) PCT Filed: Aug. 29, 2018

(86) PCT No.: PCT/KR2018/010012
§ 371 (c)(1),
(2) Date: Mar. 13, 2020

(87) PCT Pub. No.: WO2019/059552
PCT Pub. Date: Mar. 28, 2019

(65) Prior Publication Data
US 2020/0220173 A1  Jul. 9, 2020

(30) Foreign Application Priority Data

Sep. 19, 2017  (KR) .......................... 10-2017-0120659

(51) Int. Cl.
*H01M 4/525* (2010.01)
*H01M 4/04* (2006.01)
(Continued)

(52) U.S. Cl.
CPC ......... *H01M 4/525* (2013.01); *H01M 4/0459* (2013.01); *H01M 4/131* (2013.01);
(Continued)

(58) Field of Classification Search
CPC .... H01M 4/525; H01M 4/0459; H01M 4/131; H01M 4/364; H01M 4/366;
(Continued)

(56) References Cited

U.S. PATENT DOCUMENTS

2012/0273737 A1  11/2012 Ooishi
2013/0022869 A1   1/2013 Yi
(Continued)

FOREIGN PATENT DOCUMENTS

| CN | 103500827 A | 1/2014 |
| CN | 103904323 A | 7/2014 |

(Continued)

OTHER PUBLICATIONS

Dong (translation) (Year: 2015).*
(Continued)

*Primary Examiner* — Matthew T Martin
*Assistant Examiner* — Paul Christian St Wyrough
(74) *Attorney, Agent, or Firm* — Lerner, David, Littenberg, Krumholz & Mentlik, LLP

(57) ABSTRACT

A positive electrode active material for a secondary battery is provided. The positive electrode active material being a lithium cobalt-based oxide includes a doping element M. A lithium cobalt-based oxide particle containing the doping element M in an amount of 3,000 ppm or more, wherein in a bulk portion corresponding to 90% of a core side among the radius from a core of the particle to a surface thereof, the doping element M in the lithium cobalt-based oxide particle is contained at a constant concentration, and in a surface portion from the surface of the particle to 100 nm in a core (Continued)

direction, the doping element M is contained at a concentration equal to or higher than that in the bulk portion and has a concentration in which the concentration thereof is gradient gradually decreased in the core direction from the surface of the particle.

18 Claims, 4 Drawing Sheets

(51) Int. Cl.
    *H01M 4/131*     (2010.01)
    *H01M 4/36*     (2006.01)
    *H01M 10/0525*     (2010.01)
    *H01M 10/0569*     (2010.01)
    *H01M 4/02*     (2006.01)

(52) U.S. Cl.
    CPC .......... *H01M 4/364* (2013.01); *H01M 4/366* (2013.01); *H01M 10/0525* (2013.01); *H01M 10/0569* (2013.01); *H01M 2004/021* (2013.01); *H01M 2004/027* (2013.01); *H01M 2004/028* (2013.01); *H01M 2220/20* (2013.01)

(58) Field of Classification Search
    CPC ......... H01M 10/0525; H01M 10/0569; H01M 2004/021; H01M 2004/027; H01M 2004/028; H01M 2220/20
    USPC .................................................... 429/231.95
    See application file for complete search history.

(56) References Cited

U.S. PATENT DOCUMENTS

| | | | |
|---|---|---|---|
| 2013/0071161 A1 | 3/2013 | Ueno et al. | |
| 2013/0071661 A1 | 3/2013 | Chen et al. | |
| 2013/0323596 A1 | 12/2013 | Morita et al. | |
| 2014/0322605 A1 | 10/2014 | Oh et al. | |
| 2016/0156030 A1 | 6/2016 | Sun et al. | |
| 2017/0263925 A1 | 9/2017 | Shim et al. | |

FOREIGN PATENT DOCUMENTS

| | | | | | |
|---|---|---|---|---|---|
| CN | 104241633 | A | * | 12/2014 | ........ H01M 10/0525 |
| CN | 105047906 | A | * | 11/2015 | .......... H01M 4/1391 |
| CN | 105047906 | A | | 11/2015 | |
| EP | 3217453 | A1 | | 9/2017 | |
| JP | 2011082133 | A | | 4/2011 | |
| JP | 2015519005 | A | | 7/2015 | |
| JP | 2016213207 | A | | 12/2016 | |
| KR | 100812547 | B1 | | 3/2008 | |
| KR | 20130005885 | A | | 1/2013 | |
| KR | 20130010341 | A | | 1/2013 | |
| KR | 20140142171 | A | | 12/2014 | |
| KR | 101488696 | B1 | | 2/2015 | |
| KR | 20160039983 | A | | 4/2016 | |
| KR | 20170063387 | A | | 6/2017 | |
| WO | 2011043296 | A1 | | 4/2011 | |

OTHER PUBLICATIONS

Huang (translation) (Year: 2014).*
European Search Report for Application No. EP18858198, dated Oct. 27, 2020, 7 pages.
Yang-Kook Sun et al: "High-energy cathode material for long-life and safe lithium batteries", Nature Materials, vol. 8, No. 4, Mar. 22, 2009 (Mar. 22, 2009), pp. 320-324, XP055169312.
Search report from International Application No. PCT/KR2018/010012, dated Mar. 12, 2019.
Search Report dated Jul. 27, 2022 from the Office Action for Chinese Application No. 201880059188.3 dated Aug. 3, 2022, 2 pages.

* cited by examiner

POSITIVE ELECTRODE ACTIVE MATERIAL FOR SECONDARY BATTERY, METHOD FOR PREPARING THE SAME, AND LITHIUM SECONDARY BATTERY INCLUDING THE SAME

CROSS-REFERENCE TO RELATED APPLICATIONS

The present application is a national stage entry under 35 U.S.C. 317 of PCT/KR2018/010012 filed on Aug. 29, 2018, which claims priority to Korean Patent Application No. 10-2017-0120659, filed on Sep. 19, 2017, in the Korean Intellectual Property Office, the disclosures of which are incorporated herein in their entirety by reference.

TECHNICAL FIELD

The present invention relates to a positive electrode active material for a secondary battery, a method for preparing the same, and a lithium secondary battery including the same.

BACKGROUND ART

Recently, with the rapid spread of electronic devices employing a battery, such as a mobile phone, a notebook computer and an electric vehicle, the demand for a secondary battery which is small in size, light in weight and relatively high in capacity is rapidly increasing. Particularly, a lithium secondary battery is light in weight and has a high energy density, so that it is attracting attention as a driving power source for portable devices. Accordingly, research and development efforts for improving the performance of a lithium secondary battery are being actively conducted.

The lithium secondary battery means a battery including a positive electrode including a positive electrode active material capable of intercalating/deintercalating lithium ions, a negative electrode including a negative electrode active material capable of intercalating/deintercalating lithium ions, and an electrolyte containing lithium ions in an electrode assembly in which a microporous separator is interposed between the positive electrode and the negative electrode.

As the positive electrode active material of the lithium secondary battery, a lithium transition metal oxide is used, and as the negative electrode active material, a lithium metal, a lithium alloy, a crystalline or amorphous carbon, a carbon composite or the like is used. The active material is applied on an electrode current collector with an appropriate thickness and length, or the active material itself is applied in a film form, and wrapped or laminated together with the separator as an insulator to form an electrode group. Thereafter, the electrode group is placed in a can or a similar container, and then the electrolyte is added to prepare a secondary battery.

As a positive electrode active material of a lithium secondary battery which is being actively researched and used at present, there is a lithium cobalt oxide ($LiCoO_2$) having a laminated structure. The lithium cobalt oxide ($LiCoO_2$) has advantages of high operating voltage and excellent capacity characteristics, but has a disadvantage in that thermal characteristics thereof are deteriorated due to destabilization of crystal structure caused by de-lithium, and the structure becomes unstable under high voltage. Further, the oxidation number of Co is increased to 4+ and oxidized at the time of charging, and due to a side reaction with the electrolyte, the lithium cobalt oxide ($LiCoO_2$) has problems in that the surface stability is deteriorated and the service life is lowered.

Recently, the demand for a high capacity lithium secondary battery is increasing. In the case of a lithium cobalt oxide ($LiCoO_2$), unlike a ternary positive electrode active material, the capacity thereof may be increased only by increasing the voltage, so that it is necessary to secure structural stability even at a voltage of 4.5 V or more which is higher than the conventional 4.45 V or less. At the same time, there is a need to develop a lithium cobalt oxide ($LiCoO_2$) which may prevent the side reaction with the electrolyte to improve surface stability, and improve service life characteristics and high temperature/high voltage stability.

DISCLOSURE OF THE INVENTION

Technical Problem

An aspect of the present invention provides a positive electrode active material made of a lithium cobalt oxide ($LiCoO_2$) having excellent structural stability, particularly, a positive electrode active material for a lithium secondary battery which may prevent structural change even under a high voltage of 4.5 V or more and effectively improve surface stability to improve characteristics and secure stability at high temperature and high voltage, and a method for preparing the same.

Technical Solution

According to an aspect of the present invention, there is provided a positive electrode active material for a secondary battery, the positive electrode active material being a lithium cobalt-based oxide including a doping element M, wherein a lithium cobalt-based oxide particle contains the doping element M in an amount of 3,000 ppm or more, wherein in a bulk portion corresponding to 90% of a core side among the radius from a core of the particle to a surface thereof, the doping element M in the lithium cobalt-based oxide particle is contained at a constant concentration, and in a surface portion from the surface of the particle to 100 nm in a core direction, the doping element M is contained at a concentration equal to or higher than that in the bulk portion and has a concentration gradient gradually in which the concentration thereof is decreased in the core direction from the surface of the particle.

According to another aspect of the present invention, there is provided a method for preparing a positive electrode active material for a secondary battery, the method including: preparing a $Co_3O_4$ or CoOOH precursor doped with a doping element M in an amount of 1,000 ppm or more; mixing the doped $Co_3O_4$ or CoOOH precursor with a lithium raw material and performing a first heat treatment to prepare a lithium cobalt-based oxide including the doping element M; and mixing the lithium cobalt-based oxide with a raw material of the doping element M and performing a second heat treatment to prepare a lithium cobalt-based oxide the surface of which is additionally doped with the doping element M.

According to another aspect of the present invention, there is provided a positive electrode and a secondary battery each including the positive electrode active material.

Advantageous Effects

A positive electrode active material for a secondary battery according to the present invention has an excellent structural stability, and particularly, may prevent a structural change even under a high voltage of 4.5 V or more and effectively improve the surface stability to improve the service life characteristics and secure stability at a high temperature and a high voltage.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
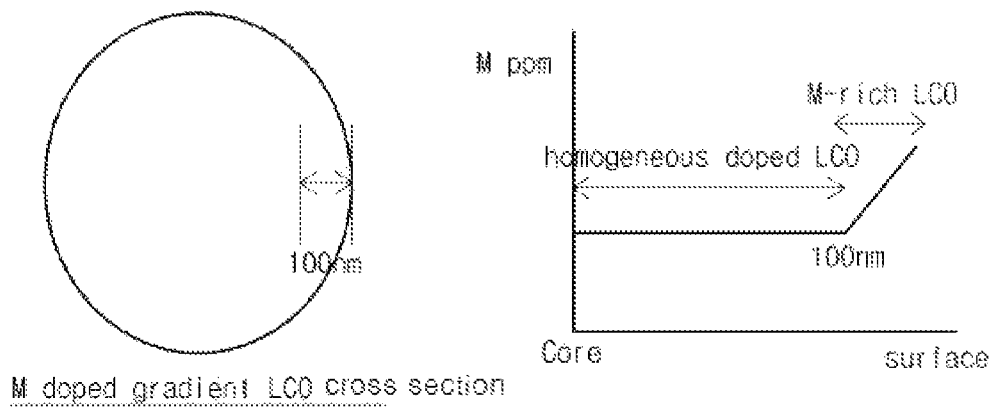
FIG. 1 is a schematic view illustrating a concentration gradient of a doping element M depending on the radius of a positive electrode active material particle according to an embodiment of the present invention.

Hereinafter, the present invention will be described in detail in order to facilitate understanding of the present invention. The terms and words used in the present specification and claims should not be construed to be limited to ordinary or dictionary terms and the inventor should properly define the concept of the term to describe its invention in the best way possible. The present invention should be construed in accordance with the meaning and concept consistent with the technical idea of the present invention.

A positive electrode active material for a secondary battery of the present invention is prepared by a method including: preparing a $Co_3O_4$ or CoOOH precursor doped with a doping element M in an amount of 1,000 ppm or more; mixing the doped $Co_3O_4$ or CoOOH precursor with a lithium raw material and performing a first heat treatment to prepare a lithium cobalt-based oxide including the doping element M; and mixing the lithium cobalt-based oxide with a raw material of the doping element M and performing a second heat treatment to prepare a lithium cobalt-based oxide the surface of which is additionally doped with the doping element M.

The positive electrode active material thus prepared according to the present invention is a lithium cobalt-based oxide including the doping element M, and includes a lithium cobalt-based oxide particle containing the doping element M in an amount of 3,000 ppm or more. In a bulk portion corresponding to 90% of a core side among the radius from a core of the particle to a surface of the particle, the doping element M in the lithium cobalt-based oxide particle is contained at a constant concentration, and in a surface portion from the surface of the particle to 100 nm in a core direction, the doping element M is contained at a concentration equal to or higher than that in the bulk portion, and has a concentration in which the concentration thereof is gradient gradually decreased in the core direction from the surface of the particle.

The positive electrode active material of the present invention may prevent a structural change of the lithium cobalt-based oxide by containing the doping element M at a constant concentration and a high content in the bulk portion of the particle, and may effectively improve the surface stability by containing the doping element M at a higher content in the surface portion of the particle such that the positive electrode active material particle has a concentration gradient.

A method for preparing a positive electrode active material for a lithium secondary battery of the present invention will be described in detail step by step below.

<Precursor Doping>

A positive electrode active material for a secondary battery of the present invention is prepared by using a precursor doped with a high amount of doping element M in an amount of 1,000 ppm or more.

The precursor doped with the doping element M in an amount of 1,000 ppm or more may be prepared by coprecipitating the raw material of the doping element M together in precursor formation to perform precursor doping. In the precursor coprecipitating step, the raw material of the doping element M is added together to perform the precursor doping, so that the doping element M may be doped heavily at a constant concentration inside the precursor.

For the precursor doping, first, a precursor forming solution including a cobalt-containing starting material and the raw material of the doping element M is prepared.

The cobalt-containing starting material may include a cobalt-containing sulfate, halide, acetate, sulfide, hydroxide, oxide, oxyhydroxide, or the like, and is not particularly limited as long as it is soluble in water. For example, the cobalt-containing starting material may be $Co(SO_4)_2 \cdot 7H_2O$, $CoCl_2$, $Co(OH)_2$, $CO(OCOCH_3)_2 \cdot 4H_2O$, $CO(NO_3)_2 \cdot 6H_2O$, or the like, and any one thereof or a mixture of two or more thereof may be used.

The raw material of the doping element M may be sulfate, nitrate, acetate, halide, hydroxide, oxyhydroxide, or the like containing the doping element M, and any one thereof or a mixture of two or more thereof may be used. The doping element M may be at least one selected from the group consisting of Al, Ti, Zr, Mg, Nb, Ba, Ca and Ta, and more preferably the doping element M may be Al, Ti or Mg.

The precursor forming solution may be prepared by adding the cobalt-containing starting material and the raw material of the doping element M to a solvent, specifically water or a mixture of water and an organic solution (specifically, alcohol or the like) capable of being uniformly mixed with water. Alternatively, the precursor forming solution may be provided by preparing a solution including the cobalt-containing starting material and a solution including the raw material of the doping element M, respectively, and then mixing the prepared solutions.

The raw material of the doping element M may be added in an amount of 0.1 to 1.0 wt %, more preferably 0.1 to 0.5 wt %, and most preferably 0.2 to 0.35 w %, with respect to the total amount of the cobalt-containing starting material and the raw material of the doping element M.

Next, the precursor forming solution may be coprecipitated to form a $Co_3O_4$ or CoOOH precursor doped with the doing element M in an amount of 1,000 ppm or more.

Specifically, the precursor forming solution may be added into a reactor, and a chelating agent and a basic aqueous solution may be added to prepare a $Co_3O_4$ or CoOOH precursor doped with the doping element M through the coprecipitating reaction.

The chelating agent may include $NH_4OH$, $(NH_4)_2SO_4$, $NH_4NO_3$, $NH_4Cl$, $CH_3COONH_4$, $NH_4CO_3$, or the like, and any one thereof may be used alone or a mixture of two or more thereof may be used. Also, the chelating agent may be used in the form of an aqueous solution. In this case, as an example of the solvent, water, or a mixture of water and an organic solvent (specifically, alcohol, etc.) capable of being uniformly mixed with water may be used.

The basic compound is a hydroxide of an alkali metal or an alkali earth metal, such as NaOH, KOH, or $Ca(OH)_2$, or a hydrate thereof, and any one thereof may be used alone or a mixture of two or more thereof may be used. The basic compound may also be used in the form of an aqueous solution. In this case, as an example of the solvent, water, or a mixture of water and an organic solvent (specifically, alcohol, etc.) capable of being uniformly mixed with water may be used. In this case, the concentration of the basic aqueous solution may be 2 M to 10 M.

The coprecipitation reaction for preparing the positive electrode active material precursor may be performed under a condition of pH 10 to pH 12. When pH is beyond the above range, the size of the positive electrode active material precursor to be prepared may be changed or the particle cleavage may occur. More specifically, the coprecipitation reaction may be performed at a condition of pH 11 to pH 12. The above pH adjustment may be controlled through the addition of the basic aqueous solution.

The coprecipitation reaction for preparing the positive electrode active material precursor may be performed under an inert atmosphere such as nitrogen in a temperature range of 30° C. to 80° C. In order to increase a reaction rate during the reaction, an agitation process may be optionally performed. In this case, an agitation speed may be 100 rpm to 2000 rpm.

As a result of the coprecipitation reaction, a $Co_3O_4$ or CoOOH precursor doped with the doping element M is precipitated. The amount of the doping element M doped in the precursor may be 1,000 ppm or more, more preferably 3,000 to 6,000 ppm. By performing the precursor doping as described above, the doping element M may be heavily doped. In addition, the precursor prepared thus may be uniformly doped with the doping element M without a concentration gradient from the core of the positive electrode active material precursor particle to the surface thereof.

The precipitated $Co_3O_4$ or CoOOH precursor is separated according to a typical method, and then a drying process may be optionally performed. In this case, the drying process may be performed at 110° C. to 400° C. for 15 hours to 30 hours.

<First Heat Treatment—Preparation of Lithium Cobalt-Based Oxide>

Next, a lithium cobalt-based oxide is prepared by mixing the $Co_3O_4$ or CoOOH precursor doped with the doping element M in an amount of 1,000 ppm or more with the lithium raw material and performing a first heat treatment.

As the lithium raw material, a lithium-containing sulfate, a lithium-containing nitrate, a lithium-containing acetate, a lithium-containing carbonate, a lithium-containing oxalate, a lithium-containing citrate, a lithium-containing halide, a lithium-containing hydroxide, a lithium-containing oxyhydroxide, or the like may be used, and lithium raw material is not particularly limited as long as it may be dissolved in water. Specifically, the lithium raw material may be $Li_2CO_3$, $LiNO_3$, $LiNO_2$, LiOH, $LiOH.H_2O$, LiH, LiF, LiCl, LiBr, LiI, $CH_3COOLi$, $Li_2O$, $Li_2SO_4$, $CH_3COOLi$, $Li_3C_6H_5O_7$ or the like, and any one thereof or a mixture of two or more thereof may be used.

In addition, the amount of the lithium raw material to be used may be determined depending on the amount of lithium and the metal element (Co, etc.) excluding lithium, in the lithium cobalt-based oxide to be finally prepared. Specifically, the lithium cobalt-based oxide to be finally prepared may be used in an amount such that a molar ratio (molar ratio of lithium/metal element) of lithium to the metal element excluding lithium becomes 0.98 to 1.1.

On the other hand, when the precursor and the lithium raw material are mixed, a sintering agent may optionally be further added. Specifically, the sintering agent may be a compound including ammonium ions, such as $NH_4F$, $NH_4NO_3$, or $(NH_4)_2SO_4$; a metal oxide such as $B_2O_3$ or $Bi_2O_3$; a metal halide such as $NiCl_2$ or $CaCl_2$), or the like, and any one thereof or a mixture of two or more thereof may be used. The sintering agent may be used in an amount of 0.01 to 0.2 moles, with respect to 1 mole of the precursor. When the amount of the sintering agent is extremely lower than 0.01 mole, the effect of improving sintering properties of the positive electrode active material precursor may be insignificant, and when the amount of the sintering agent is extremely higher than 0.2 mole, the performance as the positive electrode active material may be deteriorated due to the excessive amount of the sintering agent, and the initial capacity of the battery may be lowered during charging and discharging.

In addition, when the precursor and the lithium raw material are mixed, a moisture removing agent may optionally be further added. Specifically, examples of the moisture removing agent include citric acid, tartaric acid, glycolic acid, maleic acid, or the like, and any one thereof or a mixture of two or more thereof may be used. The moisture removing agent may be used in an amount of 0.01 to 0.2 moles, with respect to 1 mole of the precursor.

The first heat treatment may be performed at 900° C. to 1,100° C., and more preferably 1,000° C. to 1,050° C. When the first heat treatment temperature is lower than 900° C., the discharging capacity per weight unit, the cycle characteristics, and the operating voltage may be lowered due to the remaining of unreacted raw materials. When the temperature exceeds 1,100° C., the increase in particle size may result in a decrease in capacity and deterioration in rate characteristics.

The first heat treatment may be performed for 5 hours to 30 hours in an oxidizing atmosphere such as air or oxygen.

In the lithium cobalt-based oxide prepared by using the doped precursor as described above and mixing the doped precursor with the lithium raw material and then performing the first heat treatment, the doping element M doped into the precursor may have a constant concentration in the lithium cobalt-based oxide particle.

<Second Heat Treatment—Surface Doping>

Next, the lithium cobalt-based oxide and the raw material of the doping element M are mixed and subjected to a second heat treatment to prepare a lithium cobalt-based oxide the surface of which is additionally doped with the doping element M.

The raw material of the doping element M may be sulfate, nitrate, acetate, halide, hydroxide, oxyhydroxide, or the like containing the doping element M, and any one thereof or a mixture of two or more thereof may be used. The doping element M may be at least one selected from the group consisting of Al, Ti, Zr, Mg, Nb, Ba, Ca and Ta, and more preferably the doping element M may be Al, Ti or Mg. The doping element M mixed in the second heat treatment means the same doping element M as the doping element M used in the precursor doping.

The raw material of the doping element M may be mixed in an amount of 0.05 to 0.5 parts by weight, more preferably 0.1 to 0.3 parts by weight, with respect to 100 parts by weight of the lithium cobalt-based oxide. When the raw material of the doping element M is added in an amount of less than 0.05 parts by weight in the second heat treatment, the amount of the doping element M is insufficient in the surface portion of the positive electrode active material, so that it may be difficult to secure surface stability, and in the case of exceeding 0.5 parts by weight, a decrease in capacity, deterioration in rate characteristics, and an increase in resistance may occur.

On the other hand, when the lithium cobalt-based oxide and the raw material of the doping element M are mixed, a cobalt-containing material may optionally be further added. As the cobalt-containing material, the cobalt-containing starting material used in the precursor doping may be used. For example, $Co(SO_4)_2 \cdot 7H_2O$, $CoSO_4$, $CoCl_2$, $Co(OH)_2$, $Co(OCOCH_3)_2 \cdot 4H_2O$, $Co(NO_3)_2 \cdot 6H_2O$, or the like may be used, and any one thereof or a mixture of two or more thereof may be used. When the cobalt-containing material is added together, the lithium cobalt-based oxide may be further formed on the surface, and the surface doping in which the doping element M is substituted at a cobalt position may be more easily performed, and a Li-deficient structure is formed on the surface, so that a kinetically favorable active material may be formed.

The second heat treatment may be performed at 800° C. to 950° C., and more preferably 850° C. to 900° C. When the second heat treatment temperature is lower than 800° C., the doping element M is not doped inside the lithium cobalt-based oxide but a coating layer may be formed on the surface thereof, and crystallinity may be degraded to deteriorate service life characteristics, and Co dissolution may occur. When the temperature exceeds 950° C., the doping element M is diffused to the inside, and the doping element M is not in a rich state in the surface portion, so that surface stability may be deteriorated.

The second heat treatment may be performed for 3 hours to 15 hours in an oxidizing atmosphere such as air or oxygen.

In the lithium cobalt-based oxide prepared by adding the raw material of the doping element M and performing the second heat treatment as described above, in the bulk portion corresponding to 90% of the core side among the radius from the core of the lithium cobalt-based oxide particle to the surface thereof, the doping element M is contained at a constant concentration, and in the surface portion from the surface of the lithium cobalt-based oxide particle to 100 nm in the core direction thereof, the doping element M is contained at a concentration equal to or higher than in the bulk portion, and the doping element M may have a concentration gradient in which the concentration thereof is gradually decreased in the core direction from the surface of the particle.

Meanwhile, a coating layer including an inorganic oxide may be further formed on the particle surface of the lithium cobalt-based oxide prepared thus.

The coating layer may include at least one oxide selected from the group consisting of Mg, Ti, Fe, Cu, Ca, Ba, Sn, Sb, Na, Zn, Si, Y, Zr, Nb, Mo, Ru, Rh, Pd, Ag, Cd, Sc, Ce, Pr, Nd, Gd, Dy, Yb, Er, Co, Al, Ga and B. Also, the coating layer may be formed by mixing a coating material including an element for forming the coating layer and performing a third heat treatment. In this case, the temperature for the third heat treatment at the time of forming the coating layer may be about 300° C. to 600° C.

The positive electrode active material for a secondary battery of the present invention prepared as described above will be described in detail below.

<Positive Electrode Active Material>

The positive electrode active material according to an embodiment of the present invention prepared as described above may be a lithium cobalt-based oxide represented by Formula 1 below.

$$Li_aCo_{(1-x)}M_xO_2 \quad \text{[Formula 1]}$$

In Formula 1, $0.95 \leq a \leq 1.05$, $0 < x \leq 0.2$, and M is at least one selected from the group consisting of Al, Ti, Zr, Mg, Nb, Ba, Ca and Ta.

On the other hand, the lithium cobalt-based oxide may have a molar ratio (molar ratio of lithium/metal element (Co, M, etc.)) of lithium to a metal element (Co, M, etc.) excluding lithium of 0.98 to 1.1.

The positive electrode active material of the present invention is a lithium cobalt-based oxide including a doping element M, and includes the doping element M in an amount of 3,000 ppm or more. More preferably, the doping element M may be included in an amount of 5,000 to 8,000 ppm.

The doping element M may be at least one selected from the group consisting of Al, Ti, Zr, Mg, Nb, Ba, Ca and Ta. More preferably, the doping element M may be Al, Ti or Mg.

In addition, the positive electrode active material of the present invention may include 30% or more of the total weight of the doping element M in the surface portion from the surface of the particle to 100 nm in the core direction thereof. More preferably, the lithium cobalt-based oxide particle may include the doping element M in an amount of 1,000 ppm, most preferably in an amount of 1,000 to 3,000 ppm in the surface portion from the surface of the particle to 100 nm in the core direction thereof.

The doping element M in the lithium cobalt-based oxide particle has a constant concentration in the bulk portion corresponding to 90% among the radius from the core of the particle to the surface thereof. The positive electrode active material of the present invention includes the doping element M heavily doped at a constant concentration in the bulk portion of the particle, so that the change of the bulk structure may be prevented, and in particular, the structural stability may be secured even under a high voltage of 4.5V or more.

In addition, in the surface portion from the surface of the lithium cobalt-based oxide to 100 nm in the core direction thereof, the doping element M is contained at a concentration equal to or higher than that in the bulk portion and has a concentration gradient in which the concentration thereof is gradually decreased in the core direction from the surface of the particle. More preferably, the surface portion has a concentration gradient in which the concentration of the doping element M is gradually decreased from the surface of the particle to 10 to 50 nm in the core direction thereof. For example, the surface portion may have a concentration gradient in which the concentration of the doping element M is gradually decreased from the surface of the particle to 10 nm in the core direction, or from the surface of the particle to 50 nm in the core direction. Still more preferably, the surface portion may have a concentration gradient in which the concentration of the doping element M is gradually decreased from the surface of the particle to 10 to 20 nm in the core direction. In the positive electrode active material of the present invention, the doping element M is more heavily contained in the surface portion of the particle than in the bulk portion, and the positive electrode active material has a concentration gradient in which the concentration of the doping element M is gradually decreased in the core direction from the surface, so that the surface stability may be effectively improved. Accordingly, the service life characteristics of the secondary battery may be improved and the stability at a high temperature and a high voltage may be secured.

FIG. 1 is a schematic view illustrating a concentration gradient of the doping element M depending on a radius of a positive electrode active material according to an embodiment of the present invention.

Referring to FIG. 1, it can be seen that the doping element M is contained at a constant concentration from the core of the positive electrode active material particle to the surface (to 100 nm in the core direction from the surface), and the surface portion contains the doping element M at a higher concentration as a whole and has a concentration gradient in which the concentration of the doping element M is gradually decreased in the core direction from the surface. That is, the positive electrode active material prepared according to an embodiment of the present invention may have a concentration gradient in which the concentration of the doping element M is gradually decreased in the core direction from the surface as illustrated in FIG. 1, in more detail, the concentration of the doping element M is constant in the bulk portion and is increased to a higher value in the surface portion. However, the thickness of the surface portion having a concentration gradient (for example, in FIG. 1, from the surface of the particle to 100 nm in the core direction) is not necessarily specified as illustrated in FIG. 1, and the positive electrode active material includes all materials formed so as to have a concentration gradient in which the concentration of the doping element M is gradually decreased to a certain depth from the surface portion.

In addition, a positive electrode active material according to an embodiment of the present invention further includes a coating layer on the surface of the lithium cobalt-based oxide particle, and the coating layer may include at least one selected from the group consisting of Mg, Ti, Fe, Cu, Ca, Ba, Sn, Sb, Na, Z, Si, Y, Zr, Nb, Mo, Ru, Rh, Pd, Ag, Cd, Sc, Ce, Pr, Nd, Gd, Dy, Yb, Er, Co, Al, Ga and B.

As described above, the positive electrode active material made of the lithium cobalt-based oxide according to the present invention has excellent structural stability, and in particular, may secure excellent structural stability even under a high voltage of 4.5 V or more, thereby being capable of being applied to a high voltage secondary battery of 4.5 V or more and remarkably improving service life characteristics by improving surface stability.

<Positive Electrode and Lithium Secondary Battery>

According to another embodiment of the present invention, there is provided a positive electrode for a lithium secondary battery including the positive electrode active material, and a lithium secondary battery.

Specifically, the positive electrode includes a positive electrode current collector, and a positive electrode active material layer formed on the positive electrode current collector and including the positive electrode active material.

In the positive electrode, the positive electrode current collector is not particularly limited as long as it has conductivity without causing chemical changes in the battery. For example, stainless steel, aluminum, nickel, titanium, sintered carbon, stainless steel surface-treated with carbon, nickel, titanium, silver, or the like may be used. Further, the positive electrode current collector may typically have a thickness of 3 μm to 500 μm, and microscopic irregularities may be formed on the surface of the positive electrode current collector to enhance the adhesion of the positive electrode active material. The positive electrode current collector, for example, may be used in various forms such as that of a film, a sheet, a foil, a net, a porous body, a foam body, and a non-woven fabric.

In addition, the positive electrode active material layer may include a conductive agent and a binder in addition to the positive electrode active material described above.

In this case, the conductive agent is used to provide conductivity to the electrode, wherein any conductive agent may be used without particular limitation as long as it has suitable electronic conductivity without causing adverse chemical changes in the battery. Specific examples of the conductive agents may be graphite such as natural graphite or artificial graphite; carbon-based materials such as carbon black, acetylene black, Ketjen black, channel black, furnace black, lamp black, thermal black, and carbon fiber; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives. Any one thereof may be used alone or a mixture of two or more thereof may be used. The conductive agent may be typically included in an amount of 1 wt % to 30 wt % based on a total weight of the positive electrode active material layer.

The binder improves the adhesion between the positive electrode active material particles and the adhesion between the positive electrode active material and the positive electrode current collector. Specific examples of the binder may be polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, styrene butadiene rubber (SBR), fluororubber, various copolymers thereof, and any one thereof may be used alone or a mixture of two or more thereof may be used. The binder may be included in an amount of 1 wt % to 30 wt % based on the total weight of the positive electrode active material layer.

The positive electrode may be prepared according to a typical positive electrode preparation method except that the above-mentioned positive electrode active material is used. Specifically, the positive electrode may then be prepared by coating a composition for forming a positive electrode active material layer including the above-described positive electrode active material and selectively, the binder and the conductive agent on the positive electrode current collector, and then drying and rolling the coated positive electrode current collector. In this case, the types and amounts of the positive electrode active material, the binder, and the conductive agent are the same as those described above.

The solvent may be a solvent typically used in the art. Examples of the solvent include dimethyl sulfoxide (DMSO), isopropyl alcohol, N-methylpyrrolidone (NMP), acetone, water, or the like, and any one thereof may be used alone or a mixture of two or more thereof may be used. The amount of the solvent used is sufficient if the solvent may dissolve or disperse the positive electrode active material, the conductive agent, and the binder in consideration of a coating thickness of a composition for forming the positive electrode active material and production yield, and may allow to have a viscosity that may provide excellent thickness uniformity during the subsequent coating for the preparation of the positive electrode.

Alternatively, the positive electrode may be prepared by casting the composition for forming a positive electrode active material layer on a separate support, and then laminating a film separated from the support on a positive electrode current collector.

According to still another embodiment of the present invention, there is provided an electrochemical device including the positive electrode. The electrochemical device may specifically be a battery, a capacitor, or the like, and more specifically, it may be a lithium secondary battery.

The lithium secondary battery specifically includes a positive electrode, a negative electrode disposed to face the positive electrode, a separator interposed between the positive electrode and negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode current collector, and a negative electrode active material layer disposed on the negative electrode current collector.

The negative electrode current collector is not particularly limited as long as it has high conductivity without causing adverse chemical changes in the battery. For example, copper, stainless steel, aluminum, nickel, titanium, fired carbon, copper or stainless steel that is surface-treated with one of carbon, nickel, titanium, silver, or the like, and an aluminum-cadmium alloy may be used. In addition, the negative electrode current collector may typically have a thickness of 3 μm to 500 μm, and similar to the positive electrode current collector, microscopic irregularities may be formed on the surface of the current collector surface to improve the adhesion of the negative electrode active material. The negative electrode current collector, for example, may be used in various shapes such as that of a film, a sheet, a foil, a net, a porous body, a foam body, a non-woven fabric, or the like.

The negative electrode active material layer selectively includes a binder, a conductive agent, and a solvent in addition to the negative electrode active material. In an example, the negative electrode active material layer may be prepared by coating a composition for forming a negative electrode, which selectively includes the binder and the conductive agent as well as the negative electrode active material, on the negative electrode current collector, and drying the coated negative electrode current collector, or may be prepared by casting the composition for forming a negative electrode on a separate support, and then laminating a film separated from the support on the negative electrode current collector.

A compound capable of reversibly intercalating and deintercalating lithium may be used as the negative electrode active material. Specific examples of the negative electrode active material may be carbonaceous materials such as artificial graphite, natural graphite, graphitized carbon fibers, and amorphous carbon; metallic compounds alloyable with lithium, such as Si, Al, Sn, Pb, Zn, Bi, In, Mg, Ga, Cd, Si alloy, a Sn alloy, or an Al alloy; metal oxides which may be doped and undoped with lithium such as $SiO_x$ (0<x<2), $SnO_2$, vanadium oxide, and lithium vanadium oxide; or a composite including the above-described metallic compound and the carbonaceous material such as a Si—C composite or a Sn—C composite, or the like, and any one thereof or a mixture of two or more thereof may be used. In addition, a metal lithium thin film may be used as the negative electrode active material. Also, both low crystalline carbon and high crystalline carbon may be used as the carbon material. Typical examples of the low crystalline carbon may be soft carbon and hard carbon. Examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

In addition, the binder and the conductive agent may be the same as those described above for the positive electrode.

Meanwhile, in the lithium secondary battery, the separator separates the positive electrode and the negative electrode, and provides a movement path for lithium ions, wherein any separator may be used as the separator without particular limitation as long as it is typically used as a separator in a lithium secondary battery. Particularly, a separator having high moisture-retention ability for an electrolyte as well as low resistance to the transfer of electrolyte ions may be preferably used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used as the separator. Further, a typical porous nonwoven fabric, for example, a nonwoven fabric made of high melting point glass fibers, polyethylene terephthalate fibers, or the like may be used. Also, a coated separator including a ceramic component or a polymer material may be used to secure heat resistance or mechanical strength, and as the separator having a single layer or a multilayer structure may be selectively used.

In addition, the electrolyte used in the present invention may include, but is not limited to, an organic liquid electrolyte, an inorganic liquid electrolyte, a solid polymer electrolyte, a gel polymer electrolyte, a solid inorganic electrolyte, or a molten inorganic electrolyte which may be used in the preparation of the lithium secondary battery.

Specifically, the electrolyte may include an organic solvent and a lithium salt.

Any organic solvent may be used as the organic solvent without particular limitation as long as it may function as a medium through which ions involved in an electrochemical reaction of the battery may move. Specifically, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethylcarbonate (DEC), methylethylcarbonate (MEC), ethylmethylcarbonate (EMC), ethylene carbonate (EC), or propylene carbonate (PC); an alcohol-based solvent such as ethyl alcohol or isopropyl alcohol; nitrile such as R—CN (R is a straight, branched or cyclic C2-C20 hydrocarbon group, and may include a double-bond aromatic ring or ether bond); amide such as dimethylformamide; dioxolane such as 1,3-dioxolane; or sulfolane may be used as the organic solvent. Among these solvents, the carbonate-based solvent is preferable, and a mixture of a cyclic carbonate (e.g., ethylene carbonate, propylene carbonate, etc.) having high ionic conductivity and a high-dielectric constant, which may increase charge/discharge performance of the battery, and a low-viscosity linear carbonate-based compound (e.g., ethyl methyl carbonate, dimethyl carbonate, diethyl carbonate, etc.) may be preferably used. In this case, the performance of the electrolyte may be excellent when the cyclic carbonate and the chain carbonate are mixed in a volume ratio of about 1:1 to about 1:9.

The lithium salt may be used without particular limitation as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used as the lithium salt. Preferably, the lithium salt may be used in a concentration rage of 0.1 to 2.0 M. In a case in which the concentration of the lithium salt is included in the above range, since the electrolyte may have appropriate conductivity and viscosity, excellent performance of the electrolyte may be obtained and lithium ions may effectively move.

In order to improve service life characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinones, N,N-substituted imidazolidine, ethylene glycol dialkyl ether, an ammonium salt, pyrrole, 2-methoxy ethanol, or aluminum trichloride, may be further added to the electrolyte in addition to the above electrolyte components. In this case, the additive may be included in an amount of 0.1 wt % to 5 wt %, based on the total weight of the electrolyte.

As described above, since the lithium secondary battery including a positive electrode active material according to the present invention stably exhibits excellent discharge capacity, output characteristics, and capacity retention, the lithium secondary battery is suitable for potable devices, such as mobile phones, notebook computers, and digital cameras, or electrical cars such as hybrid electric vehicles (HEV).

Thus, according to another embodiment of the present invention, there is provided a battery module including the lithium secondary battery as a unit cell and a battery pack including the battery module.

The battery module or the battery pack may be used as a power source of at least one medium- or large-sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The present invention may, however, be embodied in many different forms and should not be construed as limited to the examples set forth herein.

EXAMPLE 1

In a batch type 5 L reactor set at 60° C., $CoSO_4$ was mixed in water, and $Al_2(SO_4)_3$ was further mixed in an amount of 0.3 wt % with respect to $CoSO_4$ to prepare a 2 M concentration of precursor forming solution. The container containing the precursor forming solution was connected so as to be loaded into the reactor, and a 25% concentration of NaOH aqueous solution and a 15% concentration of $NH_4OH$ aqueous solution were additionally prepared and connected to the reactor, respectively. One liter of deionized water was added to a coprecipitation reactor (capacity 5 L), and then nitrogen gas was purged into the reactor at a rate of 2 liters/minute to remove dissolved oxygen in the water, and the inside of the reactor was set to a non-oxidizing atmosphere. Thereafter, a 10 ml of 25% NaOH aqueous solution was added, and the mixture was stirred at the temperature of 60° C. at a stirring speed of 1200 rpm to maintain pH 12.0. Then, a coprecipitation reaction was performed for 1440 minutes while adding the precursor forming solution at 4 ml/min, the NaOH aqueous solution at 1 ml/min, and the $NH_4OH$ aqueous solution at 1 ml/min, respectively, and thus 3,000 ppm Al-doped $Co_3O_4$ was prepared. The resulting 3,000 ppm Al-doped $Co_3O_4$ particles were separated, washed in water, and then dried in an oven at 120° C. to prepare a positive electrode active material precursor.

The prepared positive electrode active material precursor (3,000 ppm Al-doped $Co_3O_4$) and $Li_2CO_3$ as a lithium raw material were mixed at a molar ratio of Li/Co of 1.035, and subjected to a first heat treatment for about 5 hours at 1,050° C. to prepare a lithium cobalt-based oxide.

Thereafter, 100 parts by weight of the prepared positive electrode active material and 0.34 parts by weight of $Al_2(OH)_3$ were mixed and subjected to a second heat treatment for about 5 hours at 850° C. to prepare a positive electrode active material of a lithium cobalt-based oxide the surface of which was additionally doped with Al.

EXAMPLE 2

A positive electrode active material was prepared by the same method as Example 1 except that $MgSO_4$ was used as a doping raw material in the precursor doping instead of $Al_2(SO_4)_3$ to prepare a 4,000 ppm Mg-doped $Co_3O_4$ precursor, 0.3 parts by weight of MgO was used instead of $Al_2(OH)_3$ in the second heat treatment, and the second heat treatment was performed for about 5 hours at 850° C. to prepare the positive electrode active material the surface of which was additionally doped with Mg.

COMPARATIVE EXAMPLE 1

A positive electrode active material was prepared in the same manner as in Example. 1 except that the second heat treatment was performed at a temperature of 550° C. for about 5 hours and Al was surface-coated.

COMPARATIVE EXAMPLE 2

A positive electrode active material was prepared in the same manner as in Example 1, except that a $Co_3O_4$ precursor was used without precursor doping and 0.34 parts by weight of $Al_2O_3$ (with respect to 100 parts by weight of the precursor) was mixed together and doped during the first heat treatment.

COMPARATIVE EXAMPLE 3

A positive electrode active material was prepared in the same manner as in Example 1 except that a $Co_3O_4$ precursor was used without precursor doping, 0.34 parts by weight of $Al_2O_3$ (based on 100 parts by weight of the precursor) was mixed together and doped during the first heat treatment, and the second heat treatment was performed at 550° C. for about 5 hours and Al was surface-coated.

TABLE 1

| | Bulk surface | | Surface | |
|---|---|---|---|---|
| | Precursor doping | First heat treatment doping | Second heat treatment doping (Surface doping) | Surface coating |
| Example 1 | O | X | O | X |
| Example 2 | O | X | O | X |
| Comparative Example 1 | O | X | X | O |
| Comparative Example 2 | X | O | O | X |
| Comparative Example 3 | X | O | X | O |

EXPERIMENTAL EXAMPLE 1: MEASUREMENT OF DOPING ELEMENT M CONTENT

The positive electrode active materials prepared in Examples 1 and 2 were measured by ICP to measure the total contents of the doping elements included in the positive electrode active materials, and the results are shown in Table 1.

Figure 2:
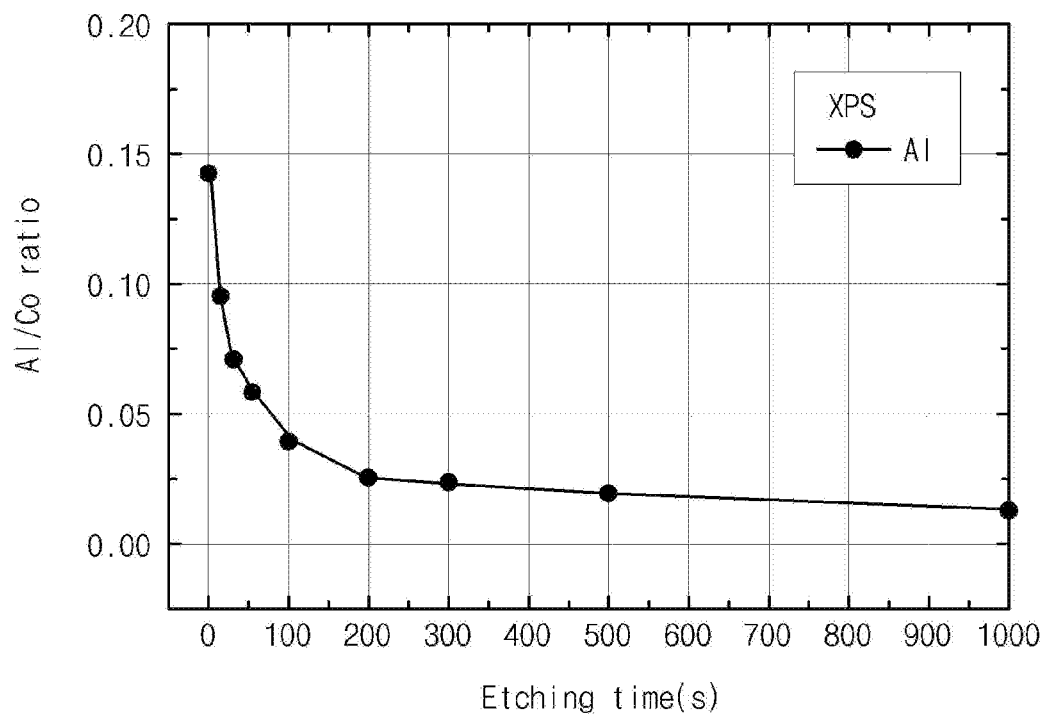
FIGS. 2 and 3 are graphs showing a ratio of a doping element M/Co by performing XPS analysis of positive electrode active materials prepared according to Examples 1 and 2, respectively.
Figure 3:
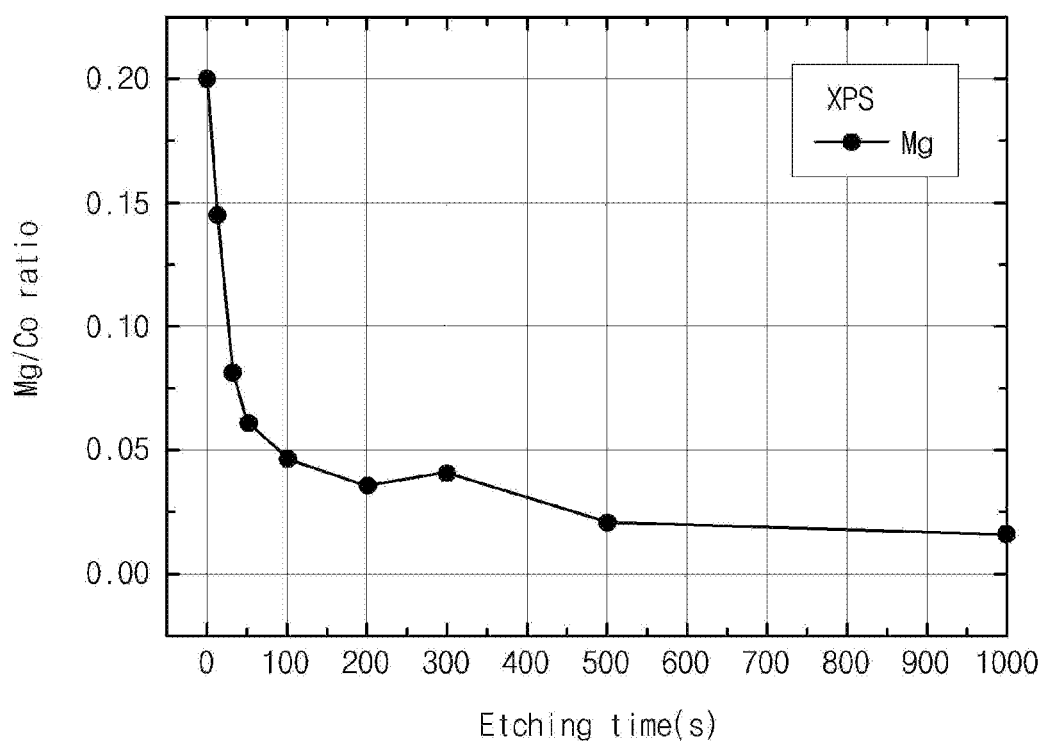

In addition, the positive electrode active materials prepared in Examples 1 and 2 were subjected to XPC analysis to measure the ratio of doping elements M and Co through a depth profile, and the results are shown in FIG. 2 (Example 1) and FIG. 3 (Example 2), respectively.

TABLE 2

| | Total content of doping element M(ppm) |
|---|---|
| Example 1 | 5,000 |
| Example 2 | 6,000 |

Referring to Table 1 and FIGS. 2 and 3, it can be seen that the positive electrode active materials of Examples 1 and 2 were doped with a doping element Al or Mg in high contents of 5,000 ppm and 6,000 ppm, respectively, exhibits higher contents on the surface side of the particle, and shows a concentration gradient in which the concentration of the doping element is gradually decreased from the particle surface toward the core.

EXPERIMENTAL EXAMPLE 2: COBALT DISSOLUTION EVALUATION

The positive electrode active materials prepared in Example 1 and Comparative Examples 1 to 3, carbon black, and a PVDF binder were mixed in a weight ratio of 90:5:5 in an N-methylpyrrolidone solvent to prepare a composition for forming a positive electrode. Also, the composition was applied on one surface of an aluminum current collector, followed by being dried at 130° C. and rolled to prepare positive electrodes, respectively. Meanwhile, lithium metal was used for a negative electrode.

A porous polyethylene separator was interposed between the positive electrode and the negative electrode prepared as described above to manufacture an electrode assembly, and the electrode assembly was positioned inside a case, and then electrolyte was injected into the case to manufacture a lithium secondary battery. In this case, the electrolyte was prepared by dissolving a 1.0 M concentration of lithium hexafluorophosphate ($LiPF_6$) in an organic solvent composed of ethylene carbonate/dimethyl carbonate/ethyl methyl carbonate (mixed volume ratio of EC/DMC/EMC=3/4/3).

The coin half cell manufactured thus was charged at 4.55 V, and the charged electrode was immersed in a 4 ml electrolyte of ethylene carbonate/dimethyl carbonate/ethyl methyl carbonate (mixed volume ratio of EC/DMC/EMC=1/2/1), and then was stored at 60° C. for a week. Thereafter, the dissolution amount of Co in the electrolyte was measured by ICP analysis using ICP-OES (Perkin Elmer, OPTIMA 7300DV), and the measured value is shown in FIG. 4.

Figure 4:
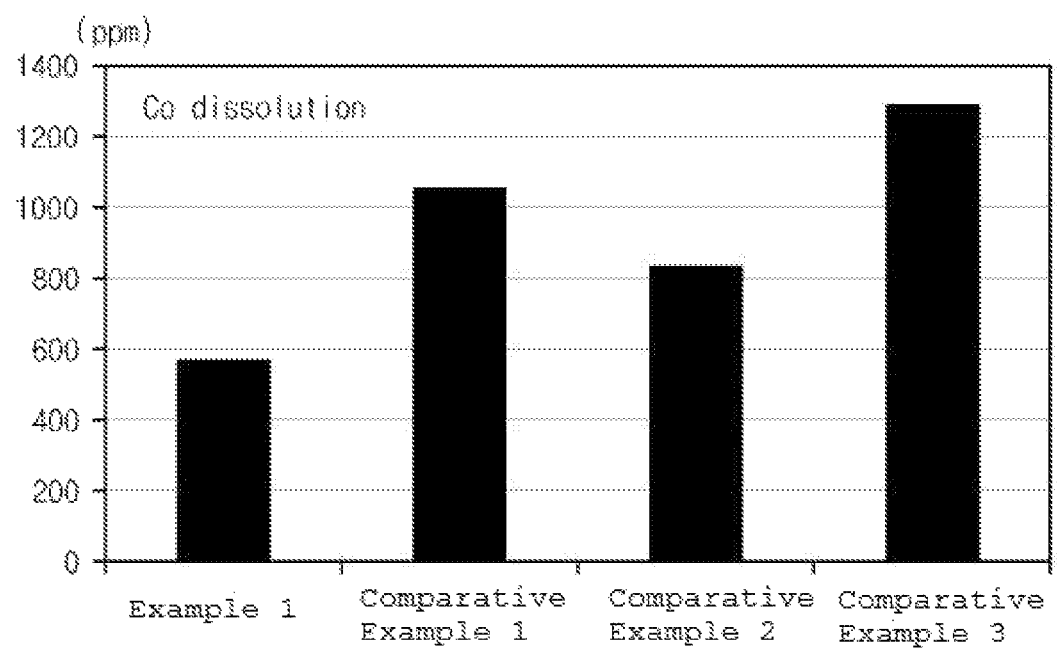
FIG. 4 is a graph measuring the degree of Co dissolution of positive electrode active materials prepared according to Example and Comparative Examples.

Referring to FIG. 4, in the case of using the positive electrode active material of Example 1 prepared by performing precursor doping and surface doping, cobalt dissolution was less, whereas in Comparative Examples 1 to 3, the cobalt dissolution was remarkably increased as compared with Example 1. That is, it can be seen that the positive electrode active material prepared according to an example of the present invention has excellent surface structure stability.

EXPERIMENTAL EXAMPLE 3: SERVICE LIFE CHARACTERISTIC EVALUATION

When each secondary battery (full cell) manufactured as described above was charged at 45° C. until it reached 0.5 C and 4.55 V in a CCCV mode and was discharged at a constant current of 1.0 C until it reached 3 V to measure a capacity retention (%) while performing charge/discharge 50 times. The results are shown in FIG. 5.

Figure 5:
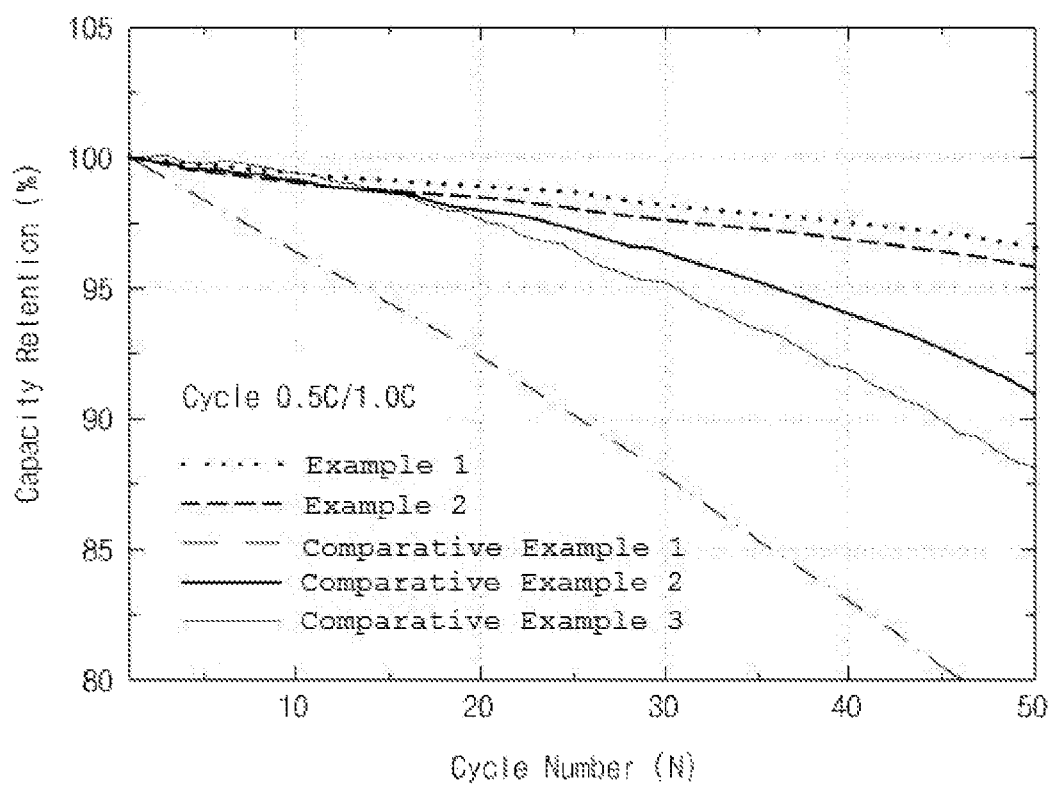
FIG. 5 is a graph evaluating service life characteristics of secondary battery cells prepared using positive electrode active materials prepared according to Example and Comparative Examples.

Referring to FIG. 5, it can be seen that Examples 1 and 2 manufactured by performing precursor doping and surface doping, compared with Comparative Examples 1 to 3, exhibit a high capacity retention up to 50 times of charging/discharging.

The invention claimed is:

1. A positive electrode active material for a secondary battery, comprising a lithium cobalt-based oxide particle contains a doping element M in an amount of 3,000 ppm or more,
    wherein the particle has a bulk portion extending to 90% of a radius of the particle from a core of the particle to a surface thereof, wherein the doping element M is contained at a constant concentration in the bulk portion, and
    wherein the particle has a surface portion extending from the bulk portion to the surface of the particle, wherein the surface portion has a thickness of 100 nm, wherein the doping element M in the surface portion is contained at a concentration equal to or higher than that in the bulk portion, and wherein the surface portion has a concentration gradient of the doping element M in which the concentration thereof decreases towards the bulk portion, and
    wherein the doping element M is at least one selected from the group consisting of Al, Ti, Zr, Mg, Nb, Ba, Ca and Ta.

2. The positive electrode active material for a secondary battery of claim 1, wherein the lithium cobalt-based oxide particle contains the doping element M in the amount of 5,000-8,000 ppm.

3. The positive electrode active material for a secondary battery of claim 1, wherein the lithium cobalt-based oxide particle contains 30% or more of a total amount of the doping element M in the surface portion from the surface of the lithium cobalt-oxide particle to 100 nm in the core direction.

4. The positive electrode active material for a secondary battery of claim 1, wherein the surface portion has the concentration gradient in which the concentration of the doping element M is gradually decreased from the surface of the lithium cobalt-based oxide particle to 10 to 50 nm in the core direction of the lithium cobalt-based oxide particle.

5. The positive electrode active material for a secondary battery of claim 1, wherein the doping element M is Al, Ti or Mg.

6. The positive electrode active material for a secondary battery of claim 1, wherein the lithium cobalt-based oxide particle is represented by Formula 1 below, $$Li_aCo_{(1-x)}M_xO_2 \qquad \text{[Formula 1]}$$

wherein, $0.95 \leq a \leq 1.05$, $0 < x \leq 0.2$, and M is at least one selected from the group consisting of Al, Ti, Zr, Mg, Nb, Ba, Ca and Ta.

7. The positive electrode active material for a secondary battery of claim 1, further comprising a coating layer on the surface of the lithium cobalt-based oxide particle,
wherein the coating layer comprises at least one oxide selected from the group consisting of Mg, Ti, Fe, Cu, Ca, Ba, Sn, Sb, Na, Zn, Si, Y, Zr, Nb, Mo, Ru, Rh, Pd, Ag, Cd, Sc, Ce, Pr, Nd, Gd, Dy, Yb, Er, Co, Al, Ga and B.

8. The positive electrode active material for a secondary battery of claim 1, wherein the lithium cobalt-based oxide has a molar ratio of lithium to metals in a range of 0.98 to 1.1, where the metals are the remaining metal elements present in the lithium-cobalt based oxide excluding lithium.

9. A method for preparing a positive electrode active material for a secondary battery, comprising:
preparing a $Co_3O_4$ or CoOOH precursor doped with a doping element M in an amount of 1,000 ppm or more;
mixing the doped $Co_3O_4$ or CoOOH precursor with a lithium raw material and performing a first heat treatment to prepare a lithium cobalt-based oxide including the doping element M; and
mixing the lithium cobalt-based oxide with a raw material of the doping element M and performing a second heat treatment to prepare a lithium cobalt-based oxide particle having a surface portion extending from the surface of the particle towards the interior thereof, and having a concentration gradient of the doping element M decreasing from the surface of the particle towards the interior thereof,
wherein the doping element M is at least one selected from the group consisting of Al, Ti, Zr, Mg, Nb, Ba, Ca and Ta.

10. The method of claim 9, wherein the preparing the doped $Co_3O_4$ or CoOOH precursor doped with the doping element M in an amount of 1,000 ppm or more comprises:
preparing a precursor forming solution including a cobalt-containing starting material and the raw material of the doping element M; and
subjecting the precursor forming solution to coprecipitation reaction.

11. The method of claim 9, wherein the precursor is doped with the doping element M in an amount of 3,000 to 6,000 ppm.

12. The method of claim 9, wherein the lithium cobalt-based oxide including the doping element M prepared after the first heat treatment comprises the doping element M at a constant concentration in the lithium cobalt-based oxide particle.

13. The method of claim 9, wherein the raw material of the doping element M is mixed in an amount of 0.05 to 0.5 parts by weight, with respect to 100 parts by weight of the lithium cobalt-based oxide.

14. The method of claim 9, wherein the second heat treatment is performed at 800 to 950° C.

15. The method of claim 9, wherein the lithium cobalt-based oxide particle comprises the doping element M in an amount of 3,000 ppm or more,
wherein the particle has a bulk portion extending to 90% of a radius of the particle from a core of the particle to the surface thereof, wherein the doping element M is contained at a constant concentration in the bulk portion, and
wherein the particle has the surface portion extending from the bulk portion to the surface of the particle, wherein the surface portion has a thickness of 100 nm, wherein the doping element M in the surface portion is contained at a concentration equal to or higher than that in the bulk portion and has a concentration gradient of the doping element M in which the concentration thereof decreases toward the bulk portion.

16. The method of claim 9, wherein the performing a heat treatment to prepare the lithium cobalt oxide the surface of the lithium cobalt-based oxide is additionally doped with the doping element M comprises further mixing a cobalt-containing starting material when the lithium cobalt-based oxide is mixed with the raw material of the doping element M.

17. A positive electrode for a secondary battery comprising the positive electrode active material according to claim 1.

18. A lithium secondary battery comprising the positive electrode according to claim 17.

* * * * *